1,874,387

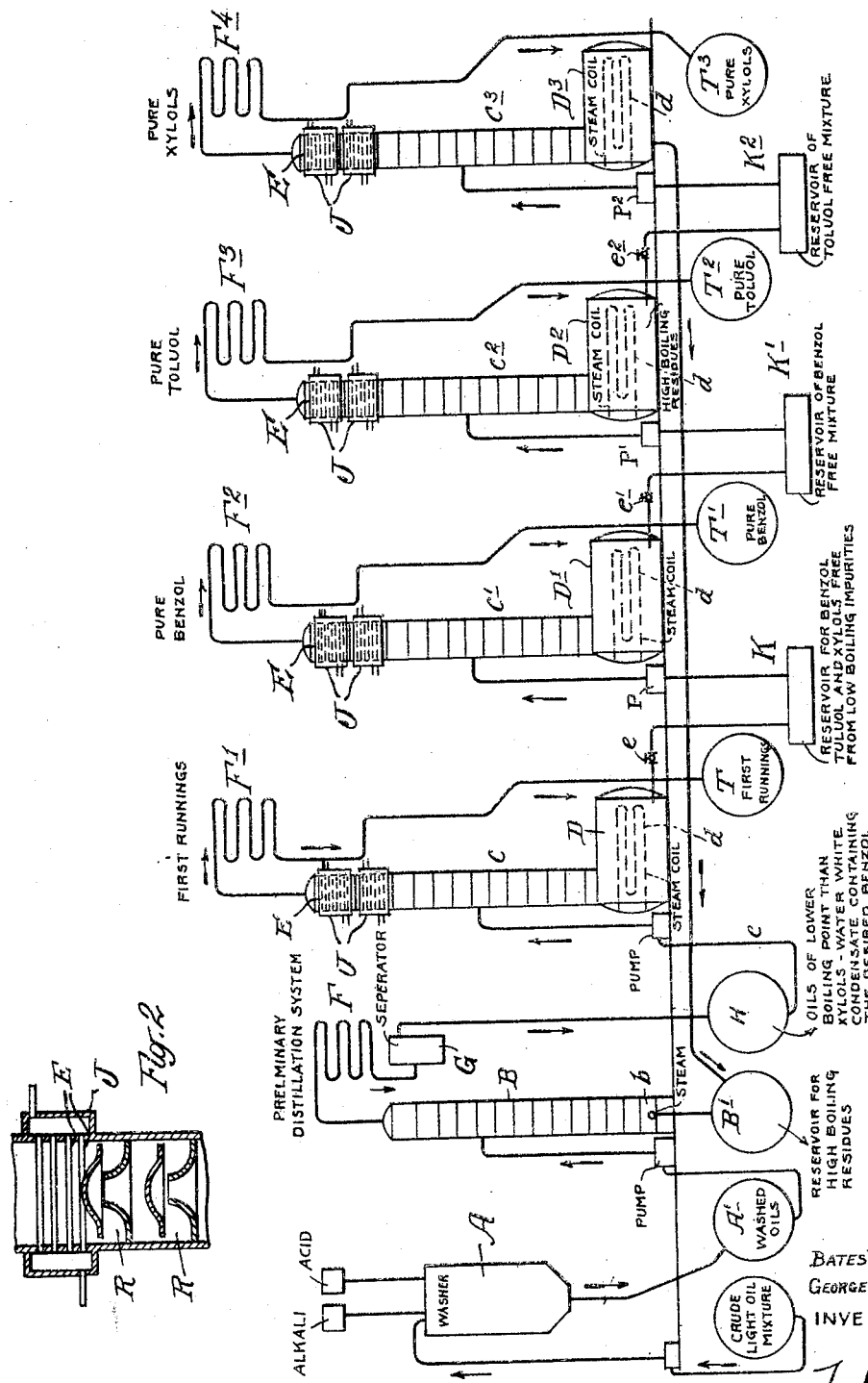
Aug. 30, 1932. B. TORREY, JR., ET AL 1,874,387
APPARATUS FOR THE SEPARATION OF LIQUIDS HAVING DIFFERENT BOILING POINTS
Original Filed Nov. 13, 1922
BATES TORREY JR.
GEORGE R. SANFORD
INVENTORS
ATTORNEY Patented Aug. 30, 1932

UNITED STATES PATENT OFFICE

BATES TORREY, JR., OF SYRACUSE, NEW YORK, AND GEORGE R. SANFORD, OF PETERSBURG, VIRGINIA, ASSIGNORS TO SEMET-SOLVAY COMPANY, OF NEW YORK, N. Y., A CORPORATION OF NEW YORK

APPARATUS FOR THE SEPARATION OF LIQUIDS HAVING DIFFERENT BOILING POINTS

Original application filed November 13, 1922, Serial No. 600,636. Divided and this application filed January 18, 1929. Serial No. 333,317.

Our invention relates to an apparatus for the separation of a mixture of liquids the constituents of which have different boiling points. More particularly our invention relates to an apparatus for the separation of the volatile light oils, which are recovered as by-products from the gas given off in the destructive distillation of coal.

This application is a division of U. S. patent application Serial No. 600,636, filed November 13, 1922, by these applicants which issued February 12, 1929, as U. S. Patent No. 1,701,988.

The volatile light oils, the principal of which are benzol, having a boiling point of 80.5° C., toluol having a boiling point of 110.3° C. and the xylols, the boiling points of which range from approximately 138° C. to 142° C., as recovered from the gas are mixed together and associated with a small proportion of still more volatile constituents, known as "first runnings", and also usually with other constituents of higher boiling points, and their usefulness and commercial value depend on their separation so that each may be recovered in a pure state uncontaminated with other ingredients.

Heretofore such separation, or fractionation of the oils and their recovery in a pure state has been effected by treating the mixture by a so-called intermittent or batch method so as to successively recover the components, of successively higher boiling points. In one of these intermittent methods a charge of liquid is passed into a still and the low boiling fraction separated by fractional distillation and dephlegmation. The residue in the still is then pumped to a reservoir and the still filled with a new charge of fresh liquid. The contents of the reservoir are fed to a second still where another fraction is distilled out and a residue obtained which is pumped to a second reservoir. The emptied still is then ready to receive another charge of residue from the first reservoir. The liquid is passed in this manner through a plurality of stills and intermediate reservoirs until the required separation of its constituents is obtained.

Attempts have also been made to effect such separation and recovery by a continuous process in which the mixed liquids, being admitted at one of a series of stills, are passed along from still to still through the series with continuous separation and removal of the components of successively higher boiling points.

So far as we are aware, however, no such process has proven successful in giving pure products, directly each of the distillates being associated with more or less of another, as an impurity, and requiring a supplementary distillation of the intermittent or batch type to effect its complete purification.

In any case, therefore, the recovery of the constituent light oils in a pure state from the crude light oil mixture has heretofore involved intermittent, or batch, fractionation steps with all the economic and operating disadvantages incident thereto.

Our invention solves the problem of recovering pure products from crude light oils directly and continuously thereby obviating the difficulties heretofore met with, and providing apparatus for a process having the recognized advantages and efficiency of a continuous operation, by which the desired components of successively higher boiling points are successively and separately recovered in a pure state and in a continuous manner.

To effect this, the crude light oil mixture is first subjected to an acid wash purification. This removes such impurities as unsaturated hydrocarbons. The washed crude oil is then subjected to distillation, preferably continuously and with direct steam, so that the non-volatile and high boiling impurities such as sulfate and resins from the acid washing, naphthalene, etc. remain behind and a distillate is obtained which is water white, substantially free from high boiling impurities and consists essentially of a mixture of the desired products and of them only.

The distillate is then continuously passed through a series of dephlegmating columns in each of which the component of lowest boiling point in that column and it only is completely distilled off by the action of hot vapors of the other components and the residue, now free from the lowest boiling component is conducted to the next succeeding column wherein the component of next higher boiling point is similarly eliminated and recovered.

In order to prevent the possible contamination of the product from a column with traces of the product of next lower boiling point due to accidental or incidental incomplete prior removal of that product, the residue from each column is conducted, not directly into the succeeding column, but into a reservoir interposed between the two columns and from this into the succeeding column. In case of the incomplete elimination from any column of the component of lowest boiling point, the flow of residue to such reservoir is cut off until complete elimination of such component is re-established. Thus each column is fed from a pool or reservoir of mixed oils which is at all times free from any trace of that component being distilled off from the preceding column, and possible contamination therewith is avoided.

The invention will be best understood by reference to the accompanying drawing, Fig. 1 of which is a diagrammatic representation of a system of apparatus which may be used in carrying the process into effect and Fig. 2 is a vertical sectional view of a portion of one of the dephlegmating columns showing details of construction on an enlarged scale.

Referring to the drawing, A, indicates any well known form of apparatus for washing the crude mixed oils with acid and an alkali to remove the unsaturated hydrocarbons. B, is a column in which the desired oils are distilled off together from the washed product by steam admitted directly thereto, C. $C^1$, $C^2$, $C^3$, indicate a series of dephlegmating columns respectively connected with stills, D, $D^1$, $D^2$, $D^3$, which are provided with heating means as steam coils $d$. The columns C, etc. are formed in the usual manner of rings or pans, R. R, and, as shown in enlarged section in Fig. 2, each is provided in its upper portions with a cooling means as tubes, or coils, E contained in cooling sections J. The columns are of such height, which can be readily determined by experiment under any given condition, as to expose a stream of the mixed oils flowing downward therethrough to hot vapors rising from the still for a sufficient time to effect the complete volatilization of its component of lowest boiling point, as is more fully hereinafter explained.

In carrying the process into effect the stills D, $D^1$, $D^2$, $D^3$, are each charged with the mixture to be fractionated with the exception of that component which is to be recovered from the column connected with such still and components having lower boiling points, or with any lesser number of the components having higher boiling points. Thus, assuming that the "first runnings" are to be distilled off from the column C, the still, D, may contain a mixture of benzol, toluol, xylol and the less volatile residue. The still, $D^1$, will contain these with the exception of benzol and so on through the series.

The mixed oils as recovered from the gas are washed in the washer, A, first with sulfuric acid to remove the unsaturated hydrocarbons and then with an alkali, as caustic soda, to remove adhering acid, and the washed oils are discharged into a receiving tank, $A^1$. From the tank, $A^1$, the oils are pumped into a distilling column, B, of any usual construction in which they are subjected to the direct action of steam, admitted to the bottom of the column, as at, $b$.

By this the oils are vaporized and separated from certain impurities of high boiling point, such as resinous materials, naphthalene and sodium sulfate. The vaporized oils are condensed in cooling coils, F, and after being separated from the water of condensation in a settling tank, G, are drawn off to a storage tank, H. The unvaporized residue is drawn off from the bottom of the column to storage tank, $B^1$. In this manner a water-white distillate of the desired volatile oils is obtained the advantages of which in the subsequent operations will be readily understood.

From the tank, H, the mixed oils are continuously admitted, as by being pumped through pipe, $c$, to column, C, and flow downward from pan to pan through the column. At the same time vapors from the heated mixture of liquids in the still, D, are rising through the column and meet the downflowing stream of liquid, vaporizing the component of lowest boiling point, in this case the "first runnings" and also some portion of the other components. The vapors pass up to the top of the column where such a temperature is maintained by the cooling coils, E, that a portion of the vapors of the component of lowest boiling point of the inflowing stream is condensed and remains as condensate in the upper pan, or pans, of the column while another portion, which as the operation progresses will equal in quantity that entering the column, C, in liquid form, continuously passes out of the column as vapor and is condensed and drawn off to storage.

In practice because of the extremely volatile and inflammable character of the "first runnings" some benzol is allowed to pass off with these. The remainder of the benzol vapors and all of the vapors of the other components of higher boiling points are condensed and the condensate flows downward through the column, C, to the still, D.

The point of admission of the liquid to the column, C, is so located as to insure as far as possible the complete vaporization of the component of lowest boiling point from the downflowing liquid stream and preferably so that the composition of the liquid corresponds with that in the column at that point. Under certain conditions, however, as of sudden change in the rate of flow of liquid or in the heat applied to the still some of the component of lowest boiling point may temporarily descend into the still. In order to prevent this from becoming mixed with the product of the succeeding still a reservoir, K, is interposed between column, C, and the column $C^1$, which receives the liquid from the still, D.

When the liquid flowing into the still D, from the column, is completely free of the component of lowest boiling point, the liquid from the still, D, passes freely into the reservoir, K, and is delivered by pump P, to the column, $C^1$. If however, it appears at any time, as can be ascertained by tests well understood by those skilled in the art, that complete volatilization of the component of lowest boiling point is not being effected, but that some of this is finding its way back to the still in liquid form with the other components, then the flow of liquid from still, D, to reservoir, K, is temporarily shut off as by closing valve, e, and the column, $C^1$, continues to be continuously fed from the accumulation of liquid in reservoir, K, until complete vaporization of the component of lowest boiling point in column, C, has been resumed and the liquid in still, D, is free therefrom.

Thus a pool of liquid free from "first runnings" is maintained and continuously fed to column, $C^1$, from which the component next in boiling point, benzol, is similarly driven off in a pure state. In the same manner, a supply of a mixture free from benzol is maintained in reservoir, $K^1$, and continuously fed to column, $C^2$, from which the toluol is driven off in a pure state and in reservoir $K^2$, a mixture free from toluol, which is continuously fed to the final column, $C^3$, in which the xylols are vaporized and driven off. If desired, on account of the small proportion of xylols present in the mixed oils, or for other reasons, the column for the recovery of the xylols may be omitted and the continuous operation stop with the recovery of the toluol. The vapor products from the several columns are respectively condensed by being passed through cooling coils $F^1$, $F^2$, $F^3$, $F^4$, and are conducted to storage tanks T, $T^1$, $T^2$, $T^3$. The unvaporized high boiling residue in still, $D^3$, is drawn off to a storage tank as $B^1$.

While the above is our preferred method of operation it will be evident that the "first runnings" may also be removed by fractional condensation of the vapors from column, B, so as to give two fractions—the first a water-white distillate containing the desired volatile oils, and the second the "first runnings". In this case the first runnings still, D, and column, C, are omitted and the water-white distillate, now already free from first runnings goes directly to the benzol column, $C^1$.

By the means hereinbefore described, we are able in a single continuous operation to separate the light oils and to recover each in a pure state whereby the necessity of redistillation to effect purification is avoided, the advantages of which will be well understood by those skilled in the art.

It will be understood that whenever in this specification or in the claims reference is made to a "pure state" of a product or to the fact that a product is "free from" or "completely free of" other components or that there is "complete removal" of one component or that a product contains "only" one component, such expressions and others of similar character refer to a condition of purity such as is represented in this art by a product which is acceptable to the trade. Thus, for example, the benzol product of this application as shipped from the factory in tank cars will obviously not necessarily be chemically pure in the sense of a laboratory reagent sold and used in quantities of the order of a few cubic centimeters or ounces although it will be pure benzol in the commerical sense for industrial or large scale manufacturing operations.

The apparatus of our invention has been particularly described in connection with its use for the separation of the light oils recovered as by-products from gas given off in the destructive distillation of coal, but the utility of the apparatus is not limited thereto. It may be employed, in general, for the separation of any mixture of liquids into fractions which have sufficiently different characteristics so that they are susceptible to separation by fractional distillation. In such a case these fractions need not necessarily each be composed of a single substance, but they may consist of mixtures of two or more substances. By employing our apparatus, the predetermined characteristics of each fraction, such as boiling point range, composition, density, etc., may be maintained during the continuous operation of that apparatus.

Having thus described our invention what we claim as new and desire to secure by Letters Patent is:—

1. An organized apparatus for the continuous treatment of liquids having different boiling components comprising in combination a series of distilling columns, a still connected with each column for passage of both liquid and gas between the still and connected column, means for heating the still, means for continuously passing the liquid into the first column of said series at a point above the bottom thereof, means in the top of each column for cooling and condensing vapors of mixed liquid arising from the still, means for cooling and condensing vapors passing out of the column, a reservoir connected with each of said stills by means arranged to permit a continuous flow of liquid from the still to the reservoir whereby a supply of liquid is maintained in the reservoir, means for shutting off the flow of liquid from each still to the reservoir connected therewith, and means for forcing liquid into the succeeding column at a point above the bottom thereof.

2. An organized apparatus for the continuous treatment of washed crude oil comprising in combination a distilling column, continuously operable means for causing an upward current of steam and a downward current of washed crude oil through said column so as to separate the mixed oils from the high boiling impurities, means for continuously condensing and collecting the distillate, means comprising a series of distilling columns and a still associated with each column for separately and successively distilling off the several components from said distillate, means for removing and condensing vaporized product from each column, means for collecting unvaporized distillate from each still and passing it to a column of a succeeding still, and means for interrupting the collection of unvaporized distillate from each still.

3. An organized apparatus for the continuous treatment of washed crude oil derived from the destructive distillation of coal, comprising in combination a distilling column, continuously operable means for causing an upward current of steam and a downward current of said washed crude oil through said column so as to separate the mixed oils from the high boiling impurities, means for continuously condensing and collecting the distillate, a series of distilling columns, a still connected with each column for passage of both liquid and gas between the still and connected column, and means for heating the still, means for continuously passing said distillate into the first column of said series at a point above the bottom thereof, means in the top of each column for cooling and condensing vapors of the mixed liquid rising from the still, means for cooling and condensing vapors passing out of the column, a reservoir connected with each of said stills by means arranged to permit a continuous flow of liquid from the still to the reservoir whereby a supply of liquid is maintained in the reservoir, means for shutting off the flow of liquor and means for forcing liquid into the succeeding column at a point above the bottom thereof.

In witness whereof we have hereunto set our hands.

BATES TORREY, Jr.
GEORGE R. SANFORD.